United States Patent
Michishita

(10) Patent No.: US 11,669,609 B2
(45) Date of Patent: Jun. 6, 2023

(54) INFORMATION PROCESSING APPARATUS, CONTROL METHOD OF THE SAME, AND STORAGE MEDIUM

(71) Applicant: CANON KABUSHIKI KAISHA, Tokyo (JP)

(72) Inventor: Takumi Michishita, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 24 days.

(21) Appl. No.: 16/901,321

(22) Filed: Jun. 15, 2020

(65) Prior Publication Data
US 2020/0401688 A1    Dec. 24, 2020

(30) Foreign Application Priority Data

Jun. 19, 2019 (JP) .............................. JP2019-113923

(51) Int. Cl.
H04L 29/06 (2006.01)
G06F 21/44 (2013.01)
G06F 21/57 (2013.01)

(52) U.S. Cl.
CPC .............. *G06F 21/44* (2013.01); *G06F 21/57* (2013.01)

(58) Field of Classification Search
CPC ................................. G06F 21/44; G06F 21/57
See application file for complete search history.

(56) References Cited

U.S. PATENT DOCUMENTS

| 8,560,823 B1* | 10/2013 | Aytek ...................... G06F 8/654 713/2 |
| 10,649,754 B2* | 5/2020 | Kanematsu ........... G06F 21/121 |
| 10,776,102 B1* | 9/2020 | Dsouza .................... G06F 21/78 |
| 2003/0035139 A1* | 2/2003 | Tomita ............... H04N 1/00973 358/1.14 |
| 2003/0131083 A1* | 7/2003 | Inui ........................... G06F 8/65 709/221 |
| 2005/0278518 A1* | 12/2005 | Ko ............................. G06F 8/65 713/1 |
| 2015/0019850 A1* | 1/2015 | Rivera .................. G06F 21/572 713/1 |
| 2018/0375891 A1* | 12/2018 | Juncker .................. H04L 63/14 |

(Continued)

FOREIGN PATENT DOCUMENTS

| JP | 2003-271420 A | 9/2003 |
| JP | 2005-208814 A | 8/2005 |

(Continued)

OTHER PUBLICATIONS

Japanese Office Action dated Feb. 17, 2023 in counterpart Japanese Patent Appln. No. 2019-113923.

*Primary Examiner* — Jason K Gee
(74) *Attorney, Agent, or Firm* — Venable LLP

(57) ABSTRACT

The present invention is directed to an information processing apparatus, comprising: upon accepting updating of a program, switching a predetermined verification function that is included in verification functions to an enabled state or a disabled state based on setting information regarding the verification functions for verifying validity of programs; and updating the program, wherein the control method further includes switching the predetermined verification function to the disabled state before the program is updated, and switching the predetermined verification function to the enabled state after updating of the program is ended.

13 Claims, 5 Drawing Sheets

(56) References Cited

U.S. PATENT DOCUMENTS

2019/0114429 A1  4/2019  Shimizu
2020/0310821 A1  10/2020  Michishita et al.

FOREIGN PATENT DOCUMENTS

| JP | 4758479 B | 8/2011 |
| JP | 2016139322 A | 8/2016 |
| JP | 2019075000 A | 5/2019 |

\* cited by examiner

F I G. 2
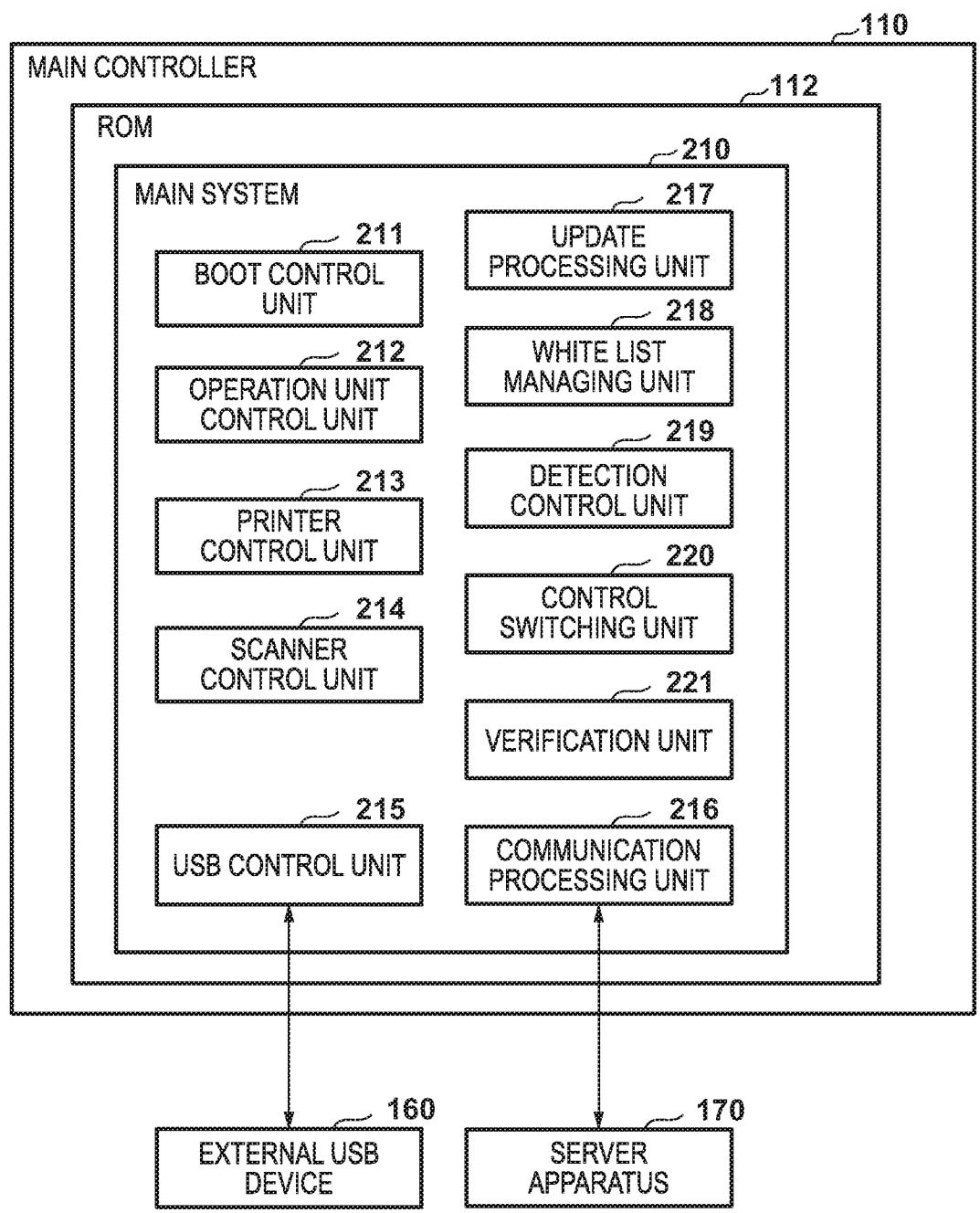

FIG. 3

| | DURING NORMAL OPERATION 301 | DURING FIRMWARE TRANSFER 302 | DURING OLD FIRMWARE BACKUP OPERATION 303 | DURING PROGRAM UPDATE 304 |
|---|---|---|---|---|
| CONTROL OF REWRITE | ON | OFF | OFF | OFF |
| CONTROL OF READING | OFF | OFF | OFF | OFF |
| CONTROL OF BINARY EXECUTION | ON | ON | ON | ON |
| CONTROL OF SCRIPT EXECUTION | ON | ON | ON | ON |

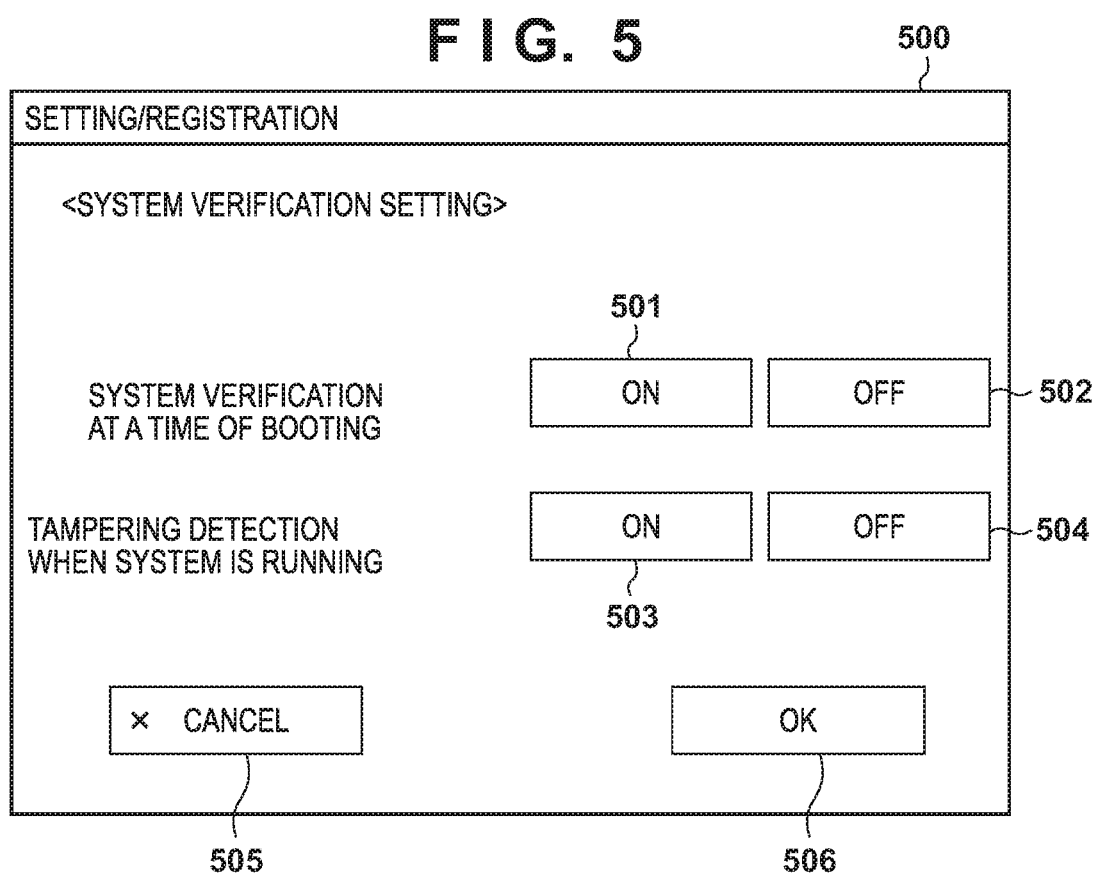

INFORMATION PROCESSING APPARATUS, CONTROL METHOD OF THE SAME, AND STORAGE MEDIUM

BACKGROUND OF THE INVENTION

Field of the Invention

The present invention relates to an information processing apparatus, a control method of the information processing apparatus, and a storage medium.

Description of the Related Art

In some cases, programs, such as applications and firmware, that are installed in an information processing apparatus such as an image forming apparatus are often updated after being released to the market, at destinations of the release, to correct problems or add functions. When firmware is distributed, signature encryption is usually performed on the firmware to be distributed to prevent tampering and unauthorized updating. If firmware is distributed after the firmware is compressed and signature encryption is performed, the size of data to be transferred can be reduced, and tampering can be prevented by performing signature verification of downloaded encrypted firmware before actually installing the firmware.

In a case in which firmware is distributed after a file of the firmware is compressed, the compressed file of the distributed firmware is extracted and arranged in a storage apparatus of an information processing apparatus when the firmware is installed. Accordingly, tampering and aging deterioration (hereinafter collectively referred to as "tampering") of the extracted file cannot be prevented by a method of performing signature encryption when distributing the firmware. As a method for verifying validity of an updated file, Japanese Patent Laid-Open No. 2019-75000 proposes a method for initially starting a boot program that is stored in a region in which rewriting cannot be performed, when a power source is turned ON, and verifying validity of other programs except for the boot program when the programs are started. In this validity verification, correct answer values of respective programs are calculated, it is determined whether or not the calculated values match correct answer values of the programs that are stored in advance, and the programs are started if the calculated values match the correct answer values to prevent an unauthorized program from being started.

Furthermore, as a method (tampering detection method) for verifying validity of a program at run time while an image forming apparatus is operating, a method for detecting tampering by using a white list method is known. In the white list method, verification data of individual files of firmware that can be used is stored in advance, and tampering of the firmware is verified using the verification data when the firmware is to be used, to enable use of only correct firmware. Here, a hash value that is created using a hash function from binary data of each file in which firmware is stored is usually used as verification data, to confirm uniqueness of the firmware. Hash values have a characteristic in that if a hash value is created from a value, the original value cannot be altered without changing the hash value, and therefore hash values can be used in tampering verification to check if firmware is correct or not. Tampering is checked by calculating a hash value of an entire file when firmware is to be executed or the file is to be opened and checking whether or not the hash value matches verification data of the file that is stored in a white list. If the hash value does not match the verification data, it is considered that the file has been tampered with, and a notification such as a warning is given to a user.

In a check method in which a white list is used, even if a file that is extracted at updating is tampered with later, tampering can be detected when the file managed using the white list is to be executed. A white list is usually managed by prohibiting writing processing that is performed using a program, but when firmware that includes a file managed using the white list is updated, the firmware and the white list need to be properly updated. Japanese Patent Laid-Open No. 2016-139322 proposes disabling a white list when software that is not included in the white list is installed and registering the installed software in the white list.

Only performing system verification of the above-described conventional technology at the time of booting is considered to be insufficient as a measure against a threat of an unauthorized program being executed while the image processing apparatus is operating, because validity of programs is not verified at run time after boot processing is completed. On the other hand, in a method in which a white list is disabled while a program is updated and the white list is then updated, the white list can be updated with respect to the updated program. However, as a result of validity verification performed using the white list being disabled, an unauthorized malicious program may be executed.

It is also possible to consider updating firmware while executing validity verification by appropriately managing a white list. However, if the number of files to be updated in a unit time is large or a region in which files are stored span a plurality of storage devices and multiple disks are mounted, it takes time to search for file paths and execute accompanying detection processing. Therefore, program update processing may be largely increased depending on the configuration of directories in which programs are memorized or the complexity of a system.

SUMMARY OF THE INVENTION

The present invention enables realization of a mechanism for reducing downtime and ensuring security functions at the same time by preventing an increase in processing time while verifying validity of a program when software is updated.

One aspect of the present invention provides an information processing apparatus comprising: at least one memory device that stores a set of instructions; and at least one processor that executes the set of instructions to: upon accepting updating of a program, switch a predetermined verification function that is included in verification functions to an enabled state or a disabled state based on setting information regarding the verification functions for verifying validity of programs; and update the program, wherein the at least one processor further executes instructions in the memory device to switch the predetermined verification function to the disabled state before the program is updated, and switch the predetermined verification function to the enabled state after updating of the program is ended.

Another aspect of the present invention provides a control method of an information processing apparatus, comprising: upon accepting updating of a program, switching a predetermined verification function that is included in verification functions to an enabled state or a disabled state based on setting information regarding the verification functions for verifying validity of programs; and updating the program, wherein the control method further includes switching the predetermined verification function to the disabled state before the program is updated, and switching the predetermined verification function to the enabled state after updating of the program is ended.

Still another aspect of the present invention provides a non-transitory computer-readable storage medium storing a computer program for causing a computer to execute each step in a control method of an information processing apparatus, the control method including: upon accepting updating of a program, switching a predetermined verification function that is included in verification functions to an enabled state or a disabled state based on setting information regarding the verification functions for verifying validity of programs; and updating the program, wherein the control method further includes switching the predetermined verification function to the disabled state before the program is updated, and switching the predetermined verification function to the enabled state after updating of the program is ended.

Further features of the present invention will become apparent from the following description of exemplary embodiments (with reference to the attached drawings).

BRIEF DESCRIPTION OF THE DRAWINGS

FIG. 2 is a software block diagram showing a configuration of the image forming apparatus according to one embodiment.

FIG. 3 is a diagram showing one example of switching of validity verification functions according to one embodiment.

FIG. 5 is a diagram showing one example of a setting screen for system verification that is displayed in an operation panel 120 according to one embodiment.

DESCRIPTION OF THE EMBODIMENTS

Figure 1:
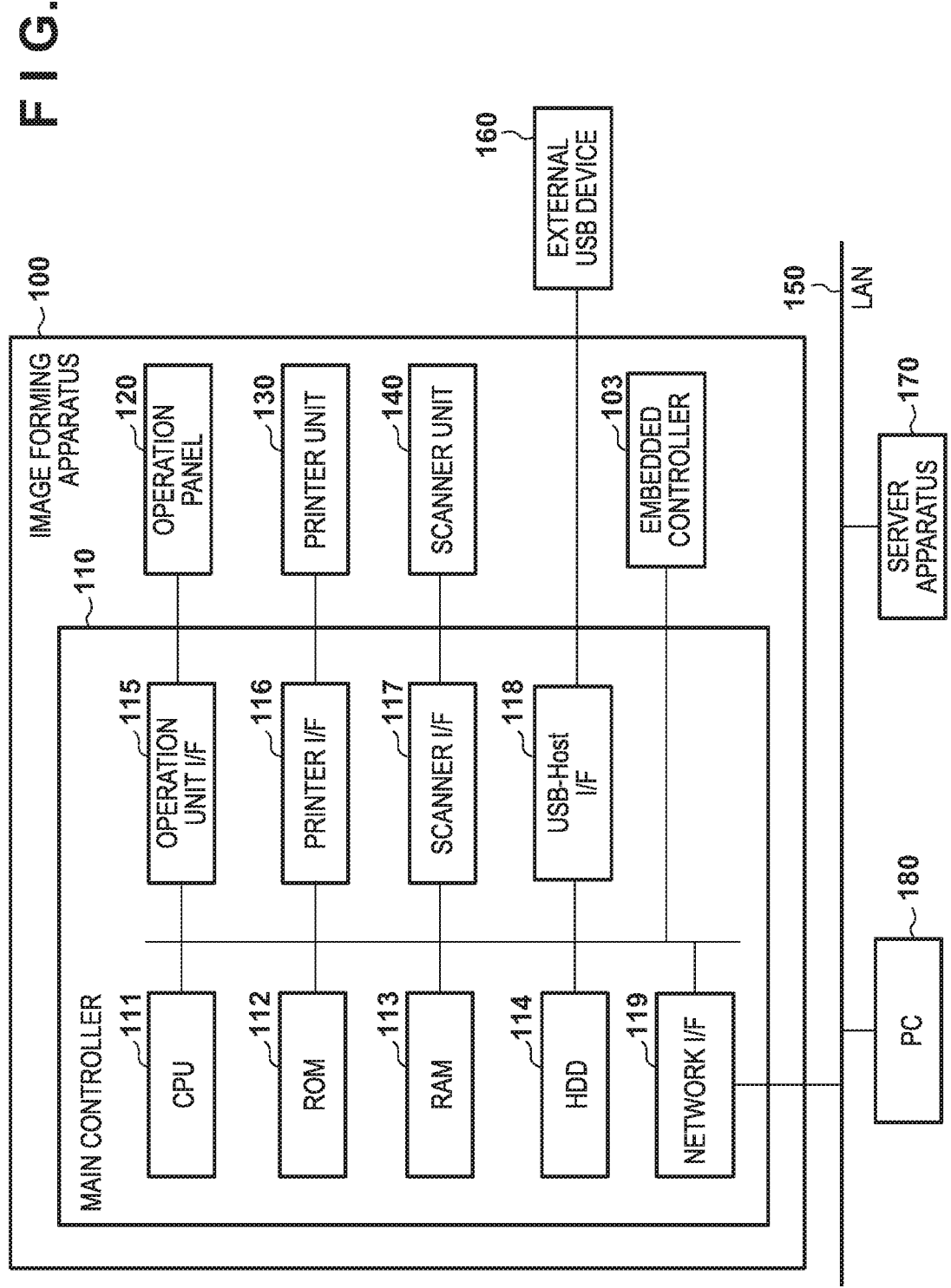
FIG. 1 is a hardware block diagram showing a configuration of an image forming apparatus according to one embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

Note that a multi-function peripheral (digital multi-function peripheral/MFP), which is an image forming apparatus, will be described as an example of an information processing apparatus according to an embodiment of the present invention. However, the present invention can be applied not only to a multi-function peripheral and is only required to be applied to an information processing apparatus.

Hardware Configuration

The following describes one embodiment of the present invention. First, a hardware configuration of an image forming apparatus 100 that is a multi-function peripheral according to one embodiment will be described with reference to FIG. 1. Note that update processing of firmware will be mainly described in the present embodiment, as an example of update processing of software that is included in the image forming apparatus 100. However, the present invention can be applied not only to such update processing but also to update processing of other software.

The image forming apparatus 100 includes a main controller 110, an embedded controller 103, an operation panel 120, a printer unit 130, and a scanner unit 140. The embedded controller 103 is provided with a ROM in which rewriting cannot be performed, and includes a verification unit that checks if a boot program is not unintentionally changed. Electronic signature technology to which a widely used public key encryption method is applied is assumed to be used for this. When the image forming apparatus 100 is turned ON, the embedded controller 103 first verifies the boot program and starts the boot program after verifying validity. Accordingly, a detailed description is omitted. Note that a configuration is also possible in which the embedded controller 103 is not installed and the main controller 110 performs similar processing.

The main controller 110 includes a CPU 111, a ROM 112, a RAM 113, a HDD 114, an operation unit I/F 115, a printer I/F 116, a scanner I/F 117, a USB-Host I/F 118, and a network I/F 119. The CPU 111 reads firmware for the main controller 110, which is stored in the ROM 112, into the RAM 113 and executes the firmware. Also, a white list that indicates correct answer value data that is used for validity verification and trusted programs is stored in the ROM 112, in addition to execution programs. License information for enabling functions of the main controller 110 is also stored in the ROM 112.

Print data that is received from a PC 180 via the network I/F 119 is stored in the hard disk drive (HDD) 114. Note that programs that are read from the ROM 112 and executed by the CPU 111 include an application program for printing. Print data stored in the HDD 114 is converted to image data that can be printed by the printer unit 130 using the application program for printing. Image data that can be printed by the printer unit 130 is also stored in the HDD 114. Also, firmware that is read from the ROM 112 and executed by the CPU 111 includes an application program for scanning. As a result of the application program for scanning being executed, the scanner unit 140 reads an image from a document and outputs image data, and the output image data is transferred to the HDD 114. The output image data is stored in the HDD 114.

The operation unit I/F 115 is an interface for transmitting instructions that are input by a user of the image forming apparatus 100 via the operation panel 120 to the CPU 111. Also, the operation unit I/F 115 receives content of processing for switching content displayed in the operation panel 120 from the CPU 111 and controls the display of the operation panel 120. Note that the operation panel 120 includes a liquid crystal display portion that has a touch panel function, a keyboard, etc., and can accept instructions from a user.

The printer I/F 116 is an interface for connecting the main controller 110 to the printer unit 130. Here, the printer unit 130 performs printing on a recording medium (a sheet etc.) based on image data transferred from the HDD 114 via the printer I/F 116.

The scanner I/F 117 is an interface for connecting the main controller 110 to the scanner unit 140. Here, the scanner unit 140 reads an image from a document using a line sensor that is constituted by a CCD (Charge Coupled Device) etc., and outputs image data. The scanner unit 140 transfers the image data via the scanner I/F 117 to the HDD 114. Image data transferred to the HDD 114 and stored in the HDD 114 can be printed by the above-described printer unit 130. Accordingly, as a result of image data read by the scanner unit 140 being printed by the printer unit 130, copy processing can be performed.

The USB-Host I/F 118 is an interface for connecting the main controller 110 to an external USB device 160. Here, examples of the external USB device 160 include a FAX unit. In the case of a FAX unit, the FAX unit performs FAX transmission based on image data that is transferred from the HDD 114 via the USB-Host I/F 118. Also, the FAX unit generates image data based on received data and transfers the image data via the USB-Host I/F 118 to the HDD 114. Note that image data stored in the HDD 114 is printed by the printer unit 130 on a recording medium as described above. Examples of the external USB device 160 also include a USB memory, a USB keyboard, etc. Update file that is necessary to update firmware can be transferred from a USB memory.

The network I/F 119 connects the main controller 110 to a LAN 150 and communicates with the PC 180 on the LAN. The PC 180 is connected to the image forming apparatus 100 via the LAN 150 and can transmit print data to the image forming apparatus 100, operate devices with respect to the image forming apparatus 100 via a WEB browser, and transfer a firmware file to the image forming apparatus 100, for example.

Furthermore, the image forming apparatus 100 is connected to a server apparatus 170 via the LAN 150 and can download an update file of software that is necessary to update firmware etc. Here, an update file is downloaded in accordance with a communication protocol such as HTTP, FTP, etc., but another communication protocol may also be used.

The latest firmware etc., with which shipped products need to be updated is always uploaded to the server apparatus 170, and necessary firmware can be acquired by making an inquiry from the image forming apparatus 100. However, there may be a case in which the image forming apparatus 100 is not connected to the server apparatus 170 depending on the installation environment of the image forming apparatus 100.

Software Configuration

Next, an example of a configuration of software that is executed by the CPU 111 of the main controller 110 according to the present embodiment will be described with reference to FIG. 2. Note that programs shown in FIG. 2 are stored in the ROM 112 shown in FIG. 1.

The main controller 110 includes a main system 210 as a software configuration, and programs for realizing various functions of the image forming apparatus 100 according to the present embodiment are arranged in the main system 210. The main system 210 includes a boot control unit 211, an operation unit control unit 212, a printer control unit 213, a scanner control unit 214, a USB control unit 215, a communication processing unit 216, an update processing unit 217, a white list managing unit 218, a detection control unit 219, a control switching unit 220, and a verification unit 221.

The boot control unit 211 is a program for controlling processing when the main system 210 is booted, and starts an OS (Operation System) of the main system 210 to start up a basic system for running various programs. The operation unit control unit 212 is a program for controlling the operation panel 120 via the operation unit I/F 116. The printer control unit 213 is a program for controlling the printer unit 130 via the printer I/F 116. The scanner control unit 214 is a program for controlling the scanner unit 140 via the scanner I/F 117.

The USB control unit 215 is a program for controlling a USB device connected to the USB-Host I/F 118, via the USB-Host I/F 118. If a USB memory is connected to the external USB device 160, the USB control unit 215 performs control relating to processing for transferring an update file and update information that are necessary to update firmware from the USB memory. The transferred file is stored in the HDD 114. The communication processing unit 216 communicates with the PC 180 or the server apparatus 170 via the network I/F 119 and performs processing for transferring an update file and update information necessary to update firmware via the LAN 150. The transferred file is stored in the HDD 114.

The update processing unit 217 performs processing for updating a program constituting the main system 210 when an instruction to update firmware etc., is given from a user via the operation panel 120, or at a time that is set in advance. Specifically, program update processing performed by the update processing unit 217 is classified as the following three types of processing. (1) Processing for transferring firmware (a program to be updated) from the external USB device 160 or the server apparatus 170. (2) Processing for backing up old firmware stored in the ROM 112. (3) Processing for updating a program stored in the ROM 112.

Backup processing of an old program is executed in order to perform roll back to the old program before being updated if program update processing cannot be normally executed due to the occurrence of a power source failure during the update processing or the occurrence of an error in writing into a storage region. In some cases, the backup processing of an old program is not executed, depending on the configuration of the backup processing or the main controller 110, or setting of update processing.

The white list managing unit 218 manages a white list with respect to programs that run on the main system 210. The white list is created as verification data for the programs of the main system 210 and prevents execution of unauthorized programs at run time in the image forming apparatus 100 that is operating. If rewrite processing such as updating of firmware that is included in the white list occurs, a special right is given to a program that executes updating, to execute the rewrite processing.

The detection control unit 219 functions as a second verification unit and verifies validity (tampering or a change due to aging deterioration) when firmware is to be executed or a file is to be opened. Note that in the following description, verification of validity of a program that is performed to detect tampering of the program or a change in the program due to aging deterioration will be simply referred to as tampering detection. That is, the term "tampering detection" used in the following description includes detection of a change in a program due to aging deterioration in addition to detection of tampering of the program. In the tampering detection, a hash value of an entire file is calculated, whether or not the hash value matches verification data of the file that is included in the white list managed by the white list managing unit 218 is checked, and if the hash value does not match the verification data, it is determined that the file has been tampered with. The detection control unit 219 performs the followings to defend file access. (1) Control of rewriting into files stored in the ROM 112 and the HDD 114. (2) Control of reading of files stored in the ROM 112 and the HDD 114. (3) Control of binary execution in the ROM 112 and the HDD 114. (4) Control of script execution in the ROM 112 and the HDD 114. Details of these will be described later using FIG. 3.

The control switching unit 220 executes switching control of tampering detection functions that are executed by the detection control unit 219. The security level of tampering detection is usually managed according to content that is prescribed for the system by default or content that is set by an administrative user in advance, but in the present embodiment, switching is dynamically performed when update processing of firmware is performed.

Update processing of a program that is included in the white list is performed as a result of a special right being temporarily given to the update processing unit 217 by the detection control unit 219. Here, if update processing of a program is executed at the same time with tampering defense processing against rewriting into files, detection processing is performed by hooking a system call for writing into a file and checking a hash value using the white list. At this time, if the number of files to be updated in a unit time is large or a region in which files are stored span a plurality of storage devices and multiple disks are mounted, it may take time to search for correct file path information and execute accompanying detection processing. Therefore, there arises a problem in that execution time of program update processing is increased depending on the configuration of directories in which programs are memorized or the complexity of the system. To deal with this problem, switching control of the tampering detection functions is executed by the control switching unit 220 if a security setting that uses the white list is enabled when program update processing is executed. Thus, an increase in update time, which causes downtime of the image forming apparatus 100 for the user, is prevented.

The verification unit 221 functions as a first verification unit and verifies programs stored in the ROM 112 when the system-boot by the main controller 110 is performed. Specifically, a signature and a public key, which is used to verify a signature of a program to be started next, are given to each program stored in the ROM 112 in advance, and signature verification is performed right before the programs are started, and the programs are started only when the verification is successful. Such verification of firmware is performed step by step when the system is booted, and firmware is sequentially started. Note that the boot program of the image forming apparatus 100 may be verified by either the embedded controller 103 or the main controller 110 as described above.

Tampering Detection Control

Next, switching control of the tampering detection functions in the present embodiment will be described with reference to FIG. 3. The tampering detection functions executed by the detection control unit (second verification unit) 219 while the image forming apparatus 100 is operating include at least rewriting control, reading control, binary execution control, and script execution control. Each function will be described. Note that information shown in FIG. 3 is preferably stored as a table in a storage unit such as the RAM 113 or the HDD 114 of the image forming apparatus 100.

Rewriting Control

With a rewriting control function, rewriting into files stored in designated regions in the ROM 112 and the HDD 114 is monitored to prevent the files from being edited by an unauthorized program or a malicious user. Programs stored in the ROM 112 are assumed to be used by applications for read-only purposes, and therefore this function is set to an enabled state (ON) by default in the present embodiment.

Reading Control

With a reading control function, reading of files stored in designated regions in the ROM 112 and the HDD 114 is prohibited to prevent access from an unauthorized program or a malicious user. Programs stored in the ROM 112 are assumed to be read by applications, and therefore this function is set to a disabled state (OFF) by default in the present embodiment.

Binary Execution Control, Script Execution Control

With a binary execution control function and a script execution control function, execution of binary files and script files that are included in the white list is restricted with respect to files stored in the ROM 112 and the HDD 114. Thus, execution of a malicious programs that is added or edited in an unauthorized manner is prevented. In the present embodiment, these functions are set to ON by default.

FIG. 3 shows setting conditions of the respective functions during a normal operation 301, a firmware transfer operation 302, an old firmware backup operation 303, and a program update operation 304. As shown in FIG. 3, according to the present embodiment, the tampering detection functions are dynamically switched between the normal operation 301 and the other operations (update operations) 302 to 304.

During the normal operation 301, rewriting control, binary execution control, and script execution control are enabled and reading control is set to OFF. In the present embodiment, reading control is set to OFF by default due to characteristics of the system, but reading control may also be set to ON with programs for which reading is permitted being designated.

Also, according to the present embodiment, rewriting control is dynamically set to a disabled state at a point in time at which program update processing is started, and rewriting control is kept disabled during the firmware transfer operation 302, the old firmware backup operation 303, and the program update operation 304. On the other hand, binary execution control and script execution control are in an enabled state during these operations 302 to 304. As a result of rewriting control being disabled, the security level temporarily decreases, but execution of malware during the update processing can be prevented because binary execution control and script execution control are always performed. Also, system reboot (reboot of the image forming apparatus 100) is always executed after firmware is updated. Thereafter, the verification unit 221 performs system verification at the time of booting, and accordingly, even if unauthorized rewrite processing is performed, tampering of a file can be normally detected.

An example in which rewriting control of tampering detection control is disabled during a period from the start to the end of the update processing has been described using FIG. 3. However, the present invention is not limited to this example, and a switching timing and a function to be switched may be changed according to the method for arranging programs or characteristics of the system. For example, if the number of files to be transferred from an external storage apparatus is small and an increase in update processing time that is caused by rewriting control is negligible, tampering detection control can be switched after firmware transfer processing. Also, in the case of an update sequence in which old firmware backup processing is not performed according to setting performed by a user, for example, tampering detection control may be switched right before processing for updating a program.

Processing Procedure

Figure 4:
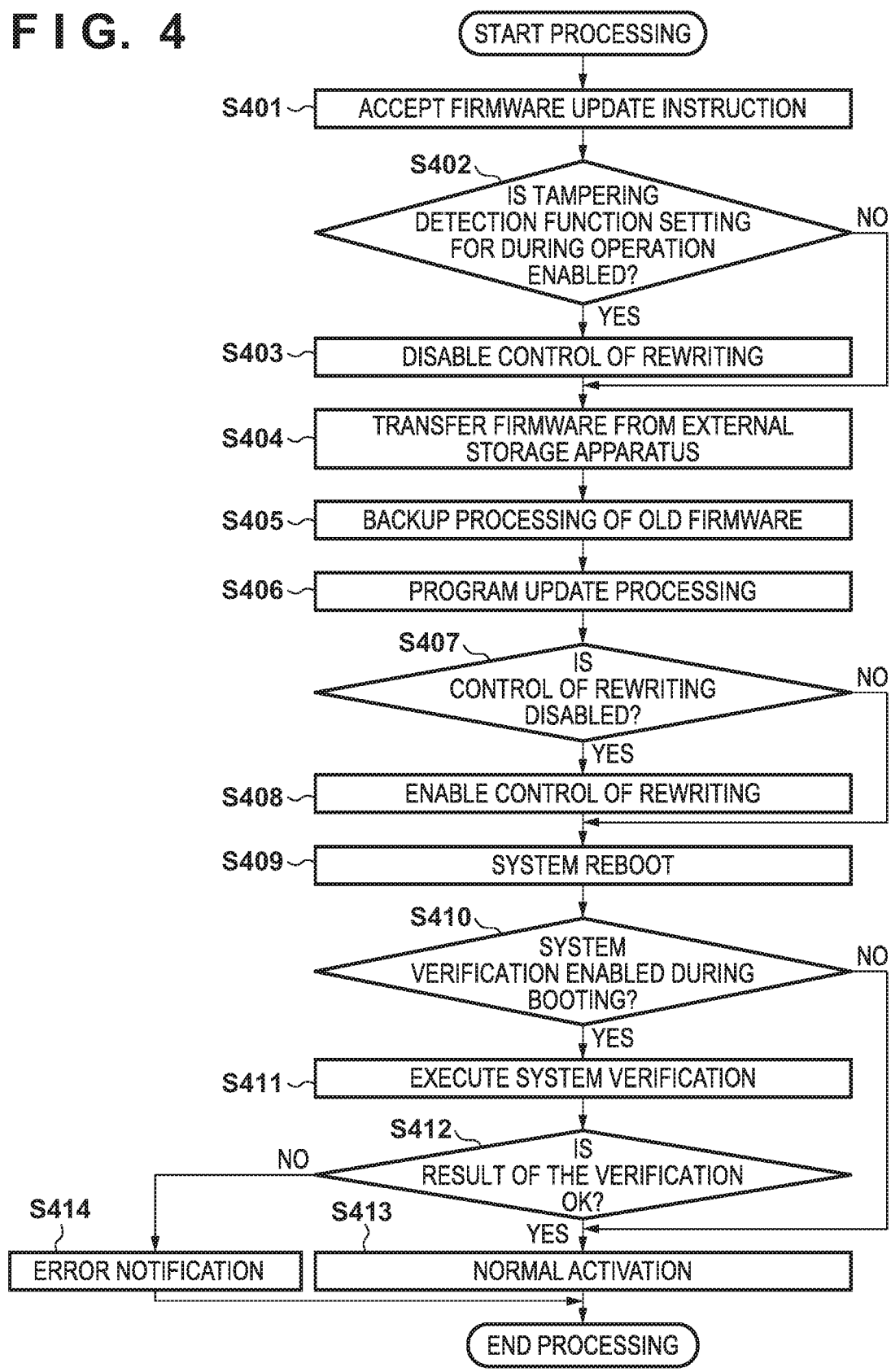
FIG. 4 is a flowchart of processing performed when firmware is updated according to one embodiment.

The following describes, with reference to FIG. 4, a processing procedure that is performed when firmware of the image forming apparatus 100 in the present embodiment is updated. A program that realizes operations shown in this flowchart is stored in the ROM 112, for example, and the CPU 111 reads the program into the RAM 113 and executes the program.

First, in step S401, the CPU 111 accepts an instruction for updating firmware. The instruction accepted in this step may be input from a user via the operation panel 120 or input via communication from the PC 180 or the server apparatus 170. Subsequently, in step S402, the CPU 111 determines whether or not tampering detection functions to be performed when the system of the main controller 110 is running are set to an enabled state. Setting of tampering detection in the present embodiment includes a setting indicating whether or not system verification is performed at the time of booting and a setting indicating whether or not tampering detection functions to be performed when the system is running are enabled, and detailed setting will be described later using FIG. 5. If the tampering detection functions to be performed when the system is running are not set to an enabled state, the routine proceeds to processing in step S404 and following steps and usual firmware update processing is executed. On the other hand, if the tampering detection functions are enabled, the routine proceeds to step S403.

In step S403, out of the enabled tampering detection functions, i.e., rewriting control, binary execution control, and script execution control, rewriting control is changed from the enabled state to a disabled state by the control switching unit 220. Thereafter, the routine proceeds to processing in step S404 and following steps, and the CPU 111 executes firmware update processing using the switched tampering detection functions.

In step S404, the CPU 111 transfers a firmware file that is to be updated from an external storage apparatus, and stores the firmware file in the HDD 114. Here, the external storage apparatus from which the firmware file is transferred may be the external USB device 160 connected via the USB-Host I/F 118, or the PC 180 or the server apparatus 170 connected via the network I/F 119.

Subsequently, in step S405, the CPU 111 executes backup processing of old firmware. Specifically, the CPU 111 executes processing for copying, out of programs stored in the ROM 112, programs for which it is determined that backup processing needs to be performed, to the HDD 114. If update processing cannot be normally executed due to the occurrence of a power source failure during a series of update processing or the occurrence of an error in writing into a storage region, programs stored in the ROM 112 are rolled back to versions before being updated, using the programs backed up in this step. Further, in step S406, the update processing unit 217 executes update processing of a group of programs stored in the ROM 112 by using data of the firmware transferred to the HDD 114 in step S404. If the update processing of the programs ends normally, the routine proceeds to step S407.

In step S407, the CPU 111 determines whether or not rewriting control of tampering detection has been changed to the disabled state in step S403, and if rewriting control has been disabled, the routine proceeds to step S408 and rewriting control is changed from the disabled state to an enabled state, and then the routine proceeds to step S409. On the other hand, if rewriting control has been kept enabled, the routine directly proceeds to step S409. In step S409, the CPU 111 reboots the system.

Next, in step S410, the CPU 111 determines whether or not a system verification function at the time of booting of the main controller 110 is set to an enabled state. This setting will be described later using FIG. 5. If it is determined in step S410 that the system verification function at the time of booting is disabled, the routine proceeds to step S413 and start processing of the image forming apparatus 100 is executed, and the processing flow is ended. On the other hand, if it is determined in step S410 that the system verification function at the time of booting is enabled, the routine proceeds to step S411, and the verification unit 221 executes verification processing of programs stored in the ROM 112 step by step when the system-boot by the main controller 110 is performed.

Thereafter, in step S412, the CPU 111 determines whether or not the system verification is normally completed. If unauthorized matter is found in the system verification, the routine proceeds to step S414 and a screen is displayed in the operation panel 120 to give a notification of an error, and the processing flow is ended. On the other hand, if it is determined in step S412 that the result of the verification is normal, the routine proceeds to step S413 and the CPU 111 executes start processing of the image forming apparatus 100, and the processing flow is ended.

Screen Example

Next, an example of a setting screen 500 for system verification that is displayed in the operation panel 120 according to the present embodiment will be described with reference to FIG. 5. The setting screen 500 is a setting screen for performing settings, to the main controller 110, regarding system verification at the time of booting, and whether or not functions relating to tampering detection to be performed when the system is running are enabled, by accepting input from a user.

System verification at the time of booting and tampering detection to be performed when the system is running are set to OFF by default. If system verification at the time of booting is performed, security can be ensured, but boot-up time becomes long depending on the size of programs to be verified. In this case, it takes a long time until a user is allowed to use ordinary functions of the image forming apparatus 100 after turning on a main power source, and therefore whether or not to execute system verification at the time of booting can be set according to the usage environment or a demand from the user.

An ON button 501 and an OFF button 502 are selection buttons regarding execution of system verification at the time of booting, and an ON button 503 and an OFF button 504 are selection buttons regarding execution of tampering detection when the system is running Here, the ON button 501 and the OFF button 502 can be selected in an initial state, and if the ON button 501 is selected to enable system verification at the time of booting, the ON button 503 and the OFF button 504 can be selected. System verification at the time of booting and tampering detection to be performed when the system is running can be enabled at the same time, but it is not possible to enable only tampering detection to be performed when the system is running. System verification at the time of booting being enabled is a precondition for enabling tampering detection to be performed when the system is running.

Due to the above-described precondition, the verification unit (first verification unit) 221 is always enabled when control performed by the detection control unit (second verification unit) 219 is enabled. Accordingly, even if rewriting control is disabled when firmware is updated, system verification at the time of booting is always executed in step S411 after the system is rebooted in step S409, and therefore defense against rewriting can be appropriately executed during update processing.

Each function can be set to an enabled state or a disabled state by selecting either the ON button 501 or the OFF button 502, and if the ON button 501 is selected, further selecting either the ON button 503 or the OFF button 504, and then pressing an OK button 506. A cancel button 505 is selected to cancel a change in the setting and close the screen.

As described above, upon accepting updating of a program, the information processing apparatus according to the present embodiment switches a predetermined verification function that is included in verification functions to an enabled state or a disabled state based on setting information regarding the verification functions for verifying validity of programs. More specifically, the information processing apparatus switches the predetermined verification function to the disabled state before the program is updated, and switches the predetermined verification function to the enabled state after updating of the program is ended. With this configuration, the present invention prevents an increase in processing time while verifying validity of a program when software is updated, to reduce downtime and ensure security functions at the same time.

Note that the present invention is not limited to the above-described embodiment and various alterations can be made. For example, in the above-described embodiment, rewriting control is disabled during transfer (acquisition) of firmware, backup processing, and program update processing (steps S404 to S406), but the present invention is not limited to this configuration, and verification functions can also be switched between an enabled state and a disabled state at other timings. Furthermore, functions switched between an enabled state and a disabled state can also be changed according to specifications, the installation environment, etc., of the image forming apparatus. For example, at least one type of control out of reading control, binary execution control, and script execution control may be disabled while rewriting control is enabled during transfer of firmware, backup processing, and program update processing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-113923 filed on Jun. 19, 2019, which is hereby incorporated by reference herein in its entirety.

What is claimed is:

1. An information processing apparatus comprising:
one or more memory devices that store a set of instructions; and
one or more processors that execute the set of instructions to:
execute monitoring for rewriting of a file stored in the one or more memory devices, and
upon accepting an update instruction of a firmware stored in the one or more memory devices, update the stored firmware to a new firmware,
wherein the monitoring for rewriting of the file is not executed at least while the stored firmware is updated to the new firmware, and then, upon updating the stored firmware to the new firmware, the monitoring for rewriting of the file is executed again before rebooting the information processing apparatus,
wherein the one or more processors execute instructions in the one or more memory devices to:
acquire a firmware to be updated from the outside;
back up an old firmware;
update the old firmware by using the acquired firmware;
disable the monitoring for rewriting of the file in a period from acquisition of the firmware to be updated to updating of the old firmware;
reboot the information processing apparatus after updating of the firmware is ended; and
enable the monitoring for rewriting of the file before rebooting the information processing apparatus.

2. The information processing apparatus according to claim 1, wherein
the one or more processors execute instructions in the one or more memory devices to:
while a system of the information processing apparatus is booted, execute a first verification process for verifying validity of the stored firmware by using a hash value that is created using a hash function; and
while the system of the information processing apparatus is running, execute a second verification process for verifying validity of the stored firmware by using a white list, and
the monitoring for rewriting of the file is a verification function that is executed in the second verification process.

3. The information processing apparatus according to claim 2, wherein
verification functions that are executed in the second verification process include at least a function for monitoring execution of the stored firmware by using the white list, a function for monitoring rewriting into a file that is stored in a designated region, and a function for monitoring reading of a file that is stored in a designated region, and the monitoring for rewriting of the file is the function for monitoring for rewriting into a file stored in a designated region.

4. The information processing apparatus according to claim 2, wherein the one or more processors execute instructions in the one or more memory devices to:

display, in a display unit, a setting screen via which a verification function that is executed in the first verification process and a verification function that is executed in the second verification process can be each set to an enabled state or a disabled state, and set each verification function to the enabled state or the disabled state according to input accepted from a user via the setting screen.

5. The information processing apparatus according to claim 1, wherein the one or more processors execute instructions in the one or more memory devices to:

execute the monitoring for rewriting of the file for monitoring for rewriting of the file after updating the stored firmware to the new firmware.

6. The information processing apparatus according to claim 1, wherein the one or more processors execute instructions in the one or more memory devices to:

disenable the monitoring for rewriting of the file upon accepting the update instruction of the stored firmware.

7. The information processing apparatus according to claim 1, wherein the one or more processors execute instructions in the one or more memory devices to:

restrict execution of a binary file stored in the one or more memory devices while the stored firmware is updated to the new firmware.

8. The information processing apparatus according to claim 1, wherein the one or more processors execute instructions in the one or more memory devices to:

restrict execution of a script file stored in the one or more memory devices while the stored firmware is updated to the new firmware.

9. A control method of an information processing apparatus, comprising:

executing monitoring for rewriting of a file stored in one or more memory devices, and upon accepting an update instruction of a firmware stored in the one or more memory devices, updating the stored firmware to a new firmware, wherein the monitoring for rewriting of the file is not executed at least while the stored firmware is updated to the new firmware, and then, upon updating the stored firmware to the new firmware, the monitoring for rewriting of the file is executed again before rebooting the information processing apparatus, wherein the one or more processors execute instructions in the one or more memory devices to:

acquire a firmware to be updated from the outside;

back up an old firmware;

update the old firmware by using the acquired firmware;

disable the monitoring for rewriting of the file in a period from acquisition of the firmware to be updated to updating of the old firmware;

reboot the information processing apparatus after updating of the firmware is ended; and enable the monitoring for rewriting of the file before rebooting the information processing apparatus.

10. The control method according to claim 9, further comprising disenabling the monitoring for rewriting of the file upon accepting the update instruction of the stored firmware.

11. The control method according to claim 9, further comprising:

restricting execution of a binary file stored in the one or more memory devices while the stored firmware is updated to the new firmware.

12. The control method according to claim 9, further comprising:

restricting execution of a script file stored in the one or more memory devices while the stored firmware is updated to the new firmware.

13. A non-transitory computer-readable storage medium storing a computer program for causing a computer to execute each step in a control method of an information processing apparatus, the control method including:

executing monitoring for rewriting of a file stored in one or more memory devices, and upon accepting an update instruction of a firmware stored in the one or more memory devices, updating the stored firmware to a new firmware, wherein the monitoring for rewriting of the file is not executed at least while the stored firmware is updated to the new firmware, and then, upon updating the stored firmware to the new firmware, the monitoring for rewriting of the file is executed again before rebooting the information processing apparatus, wherein the control method further comprises:

acquiring a firmware to be updated from the outside;

backing up an old firmware;

updating the old firmware by using the acquired firmware;

disabling the monitoring for rewriting of the file in a period from acquisition of the firmware to be updated to updating of the old firmware;

rebooting the information processing apparatus after updating of the firmware is ended; and enabling the monitoring for rewriting of the file before rebooting the information processing apparatus.

* * * * *